(12) United States Patent
Bienias (10) Patent No.: US 12,518,314 B2
(45) Date of Patent: Jan. 6, 2026

(54) METHOD AND SYSTEM FOR INTERACTIVE VIRTUAL CUSTOMIZED VEHICLE DESIGN, PURCHASE, AND FINAL ACQUISITION

(71) Applicant: Ronald Bienias, Lemont, IL (US)

(72) Inventor: Ronald Bienias, Lemont, IL (US)

( * ) Notice: Subject to any disclaimer, the term of this patent is extended or adjusted under 35 U.S.C. 154(b) by 0 days.

(21) Appl. No.: 18/118,043

(22) Filed: Mar. 6, 2023

(65) Prior Publication Data

US 2024/0303720 A1 Sep. 12, 2024

(51) Int. Cl.
  *G06Q 30/00* (2023.01)
  *G06Q 30/0601* (2023.01)

(52) U.S. Cl.
  CPC ..... *G06Q 30/0643* (2013.01); *G06Q 30/0603* (2013.01); *G06Q 30/0621* (2013.01)

(58) Field of Classification Search
  CPC .......... G06Q 30/0643; G06Q 30/0603; G06Q 30/0621
  See application file for complete search history.

(56) References Cited

U.S. PATENT DOCUMENTS

| | | | | |
|---|---|---|---|---|
| 7,353,192 B1* | 4/2008 | Ellis | ....................... | G06Q 30/02 715/765 |
| 2003/0187753 A1* | 10/2003 | Takaoka | ............. | G06Q 30/0635 705/26.81 |
| 2007/0073595 A1* | 3/2007 | Moore | .................... | G06Q 50/40 705/26.42 |
| 2007/0156540 A1* | 7/2007 | Koren | ................ | G06Q 30/0643 705/14.51 |
| 2007/0260528 A1* | 11/2007 | Ly | ....................... | G06Q 30/0633 705/26.8 |
| 2010/0036806 A1* | 2/2010 | Lam | ....................... | G06F 16/951 707/706 |

OTHER PUBLICATIONS vw.com http://www.vw.com Internet Archive (Jan. 23, 2008)—http://web.archive.org/web/20080123122655/www.vw.com/.*
vw.com http://www.vw.com Internet Archive (Jan. 23, 2008)—http://web.archive.org/web/20080123122655/www.vw.com/—Jan. 23, 2008.*

* cited by examiner

*Primary Examiner* — Kathleen Palavecino
(74) *Attorney, Agent, or Firm* — Alfred F. Hoyte, Jr.

(57) ABSTRACT

An electronic system for the customization, visualization, integration, purchase, and acquisition of a vehicle from a vehicle dealer or manufacturer/seller of custom aftermarket parts. The system is implemented on a computer server or equivalent device, where the server, operated by the manufacturer, is accessible over the internet via a suitable end-user operated computing device, the server generating a menu driven visual interface viewable on the computing device. The system allows for all aspects of a customized vehicle purchase to be performed by the user, substantially streamlining the selection and acquisition process. The system can be interfaced with third party parts databases, allowing for incorporation of parts from a variety of manufacturers. The system may also be used to purchase aftermarket parts for used cars.

8 Claims, 6 Drawing Sheets

METHOD AND SYSTEM FOR INTERACTIVE VIRTUAL CUSTOMIZED VEHICLE DESIGN, PURCHASE, AND FINAL ACQUISITION

CROSS REFERENCE TO RELATED APPLICATION

This application is a continuation-in-part of application Ser. No. 13/064,274, which is a continuation of application Ser. No. 12/654,021 filed on Dec. 8, 2009.

BACKGROUND OF THE INVENTION

1. Field of the Invention

The present invention relates to electronic commerce. More specifically, it relates to a system for performing virtual customized vehicle design including component allocation and pricing; as well as financing, purchase, negotiation, and final acquisition using an internet capable computing device.

2. Description of the Prior Art

With the development of electronic commerce, there has been a substantial increase in the availability and sophistication of commercial websites specializing in the sale and distribution of various products and services. These websites typically have software interfaces (a series of menu driven GUIs/text to permit user navigation) which allow consumers, or potential consumers, to browse products and services prior to selecting and finalizing a sale for a particular product, service, or combination of products. For certain products, specifically those which are customizable by the addition or subtraction of various components or subcomponents, it is desirable to provide an interface which allows the user to select the various components to be assembled, and/or added or subtracted to an underlying base product. The more sophisticated of such interfaces also allow the user to visualize a completed version of the product, while also providing information on the pricing of the product.

Still other interfaces associated with commercial sites allow for performing various actions relating to the completion of a transaction for the sale of customized goods and services including various methods for payment. However, these interfaces have limited capability for allowing a user to perform all of the necessary steps for customizing a product such as a new vehicle, as there are many issues which arise from the acquisition and integration of disparate components from a plurality of manufacturers and/or dealers, primarily issues involving the price, availability, and even compatibility of components selected for inclusion with the final product, as well as the price and availability of the completed product. The interfaces for selling used cars have even less utility as they often do not even list all of the features currently on the vehicle, let alone add-ons or modifications that a potential buyer might consider. A single interface which allows a user purchasing a new or used vehicle to resolve the aforementioned shortcomings is the primary object of the invention.

The following known prior art has been directed to providing a summary of the various systems of the prior art.

U.S. Pat. No. 7,353,192 issued to Ellis et al., discloses a system which allows for customizing a vehicle and viewing a virtual image of the vehicle prior to purchase.

U.S. Pat. No. 7,542,925 issued to Tung discloses a system for customizing a plurality of domestic environments, complete with visualization of completed environments, which allows a user to select and have shipped a desired combination of furniture and interior decor items.

None of the above inventions and patents, taken either singly or in combination, is seen to describe the instant invention as claimed.

SUMMARY OF THE INVENTION

Briefly, the invention comprises an electronic system for the customization, visualization, integration, purchase, and acquisition of new and used vehicles; the system implemented on a computer server or equivalent device, where the server is accessible over the internet via a suitable end-user operated computing device, the server generating a menu driven visual interface viewable on the computing device. The system allows for all aspects of a customized vehicle purchase to be performed by the user, substantially streamlining the selection and acquisition process. Once a vehicle is selected using the system interface, a three dimensional simulation is presented on the user device, along with an additional menu for selecting various components to be added to the vehicle. Selected components are displayed positioned at the appropriate position on or within the vehicle, the system automatically configuring the view most suitable for providing a realistic virtual image of the component in situ. In addition, the system will show the manufacturer's suggested retail price (MSRP) for the vehicle as currently configured, with the price updated in real time as components are added/deleted. The system can be configured for direct access by the user or for access through a dealer website, where, in the latter case, an adjusted price based on a particular dealer's pricing schedule will be displayed. Once all components are selected, the system will interface with the vehicle manufacturer's inventory database to search the inventory to ensure chosen component parts/options are in stock and if not, expected date of receipt, and reserve the chosen component parts/options and schedule the vehicle in the manufacturer's production schedule. If the system is accessed through a dealer website, the interface will then offer an opportunity to negotiate a final sales price with the dealer, offer financing and payment options either through the manufacture's or dealer's financing options, and at the end of the process provide an electronic and/or print out of a sales agreement.

Accordingly, it is a principal object of the invention to provide a comprehensive system for performing virtual customized new and used vehicle design including component allocation and pricing; as well as financing, purchase, negotiation, and final acquisition using an internet capable computing device.

It is a major object of this invention to provide a comprehensive system for performing virtual customized vehicle design which can be used to design any new or used motor vehicle including, but not limited to, automobiles, motorcycles, and RVs.

It is another object to provide a comprehensive system for performing virtual customized vehicle design which can be implemented through a dealer website.

It is another object to provide a comprehensive system for performing virtual customized vehicle design which allows for the inclusion of both components available from the manufacturer of a particular vehicle and compatible components from other manufacturers.

It is another object to provide a comprehensive system for performing virtual customized vehicle design which allows the user to access price and availability of selected components.

It is another object to provide a comprehensive system for performing virtual customized vehicle design which allows for display of a realistic three dimensional virtual image of a selected vehicle including real time depiction of the vehicle as various components are added/deleted.

It is another object to provide a comprehensive system for performing virtual customized vehicle design which allows for negotiating a final sales price for a customized vehicle.

It is another object to provide a comprehensive system for performing virtual customized vehicle design which allows purchasers of used vehicles to add upgrades or components with or without installation.

Finally, it is a general goal of the invention to provide improved elements and components thereof in a system for the purposes described which is fully effective in accomplishing its intended purposes.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
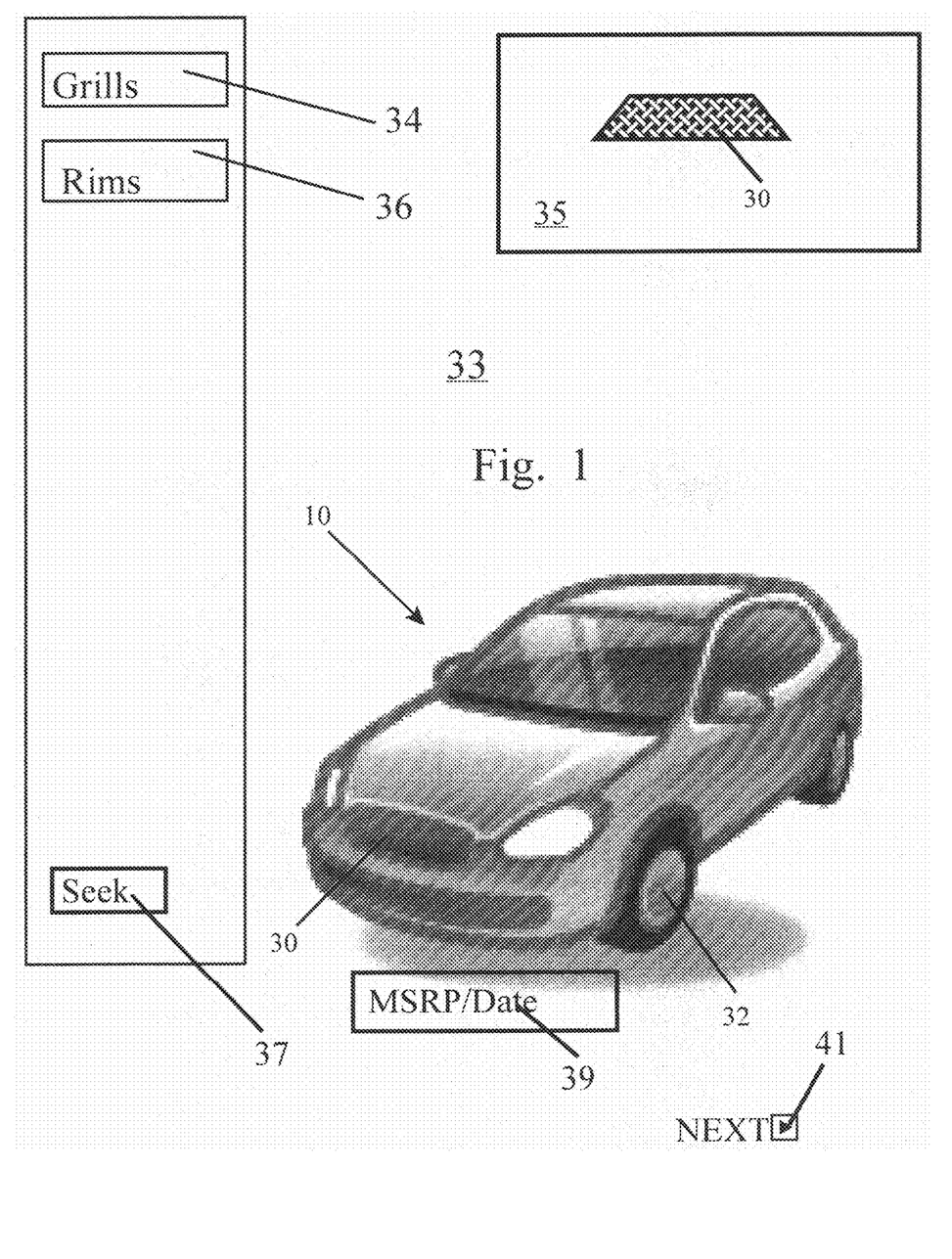
FIG. 1 is a perspective view of an image of a vehicle shown on a product display screen to be customized in accordance with the inventive system.
Figure 2:
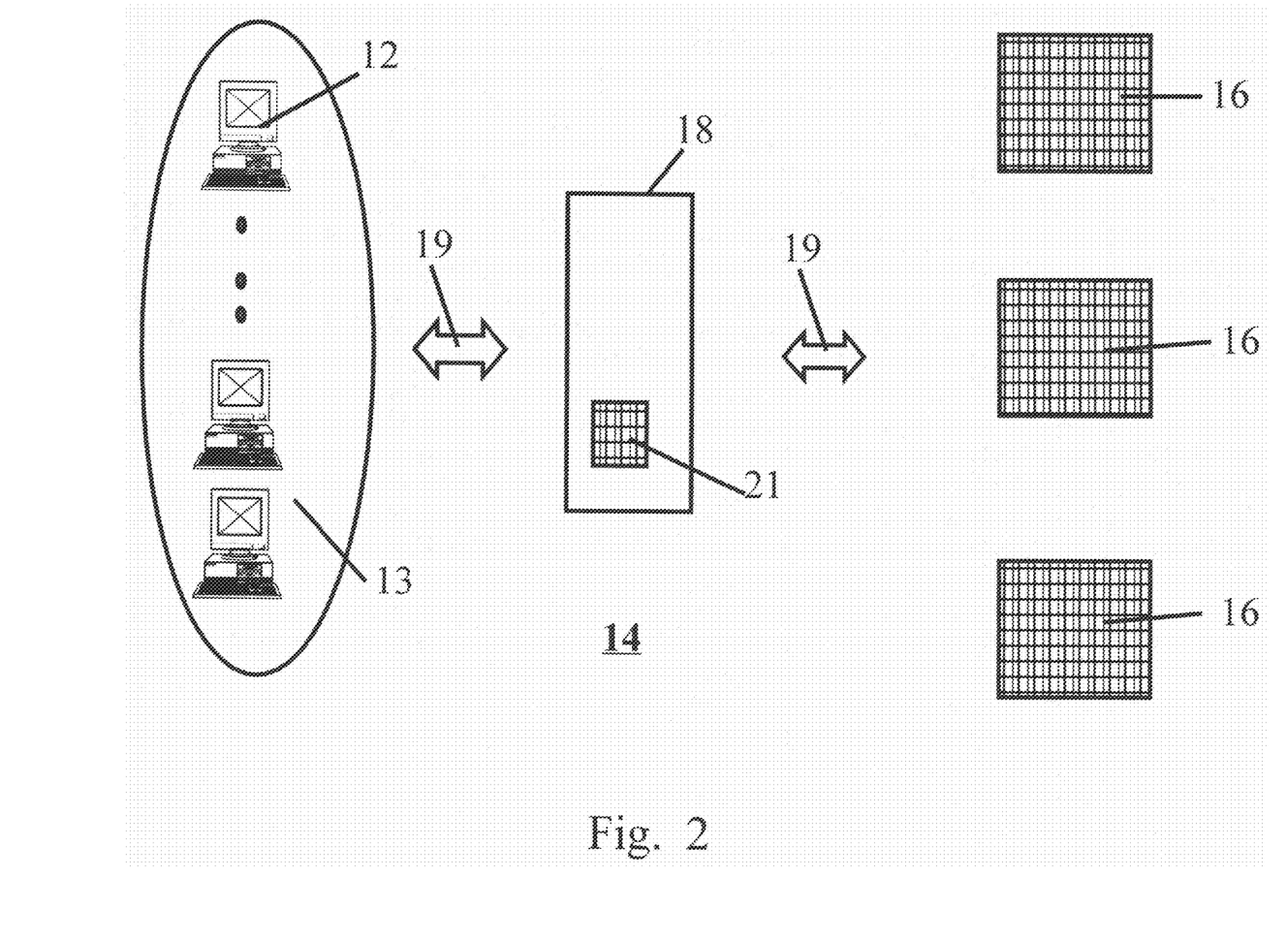
FIG. 2 is a graphical representation of the overall system of the invention illustrating the interconnection of the various computing resources necessary to perform the several functions of the invention.

Referring now to FIGS. 1 and 2, a representative vehicle displayed on a simulated webpage, generally designated by the numeral 10, is shown, the vehicle 10 to be customized and, if desired, purchased using the system of the present invention. The vehicle 10 may be new or used, but in the case of a used vehicle 10 the customization and installation options are limited as will be explained in more detail below. The vehicle 10 can be modified both cosmetically and mechanically to enhance either aesthetics or performance or both. A key aspect of the invention is that a vehicle may be customized by the addition or removal of external and internal components using the system of the invention, with the resulting change in appearance, if any, being viewable on a product display screen transmitted to a user operated computing device or terminal 12. In accordance with the method of the invention, the customized vehicle 10 would be available directly from a vehicle manufacturer (Ford, GM), where the manufacturer includes the selected components prior to shipping to a dealer selected by the user as described below. It can be appreciated that the vehicle manufacturer is in the best position to determine the compatibility of customizing components, and is therefore best able to choose the components from a wide variety of available components which can be most effectively integrated with a given vehicle.

In another embodiment, the inventive system can be modified as described below for the purchase of either a used vehicle, or for the purchase of customizing components for a used or recently purchased vehicle already owned by the user. In this case, in lieu of a manufacturer, the vendor can be an aftermarket parts provider or a used car dealer.

With particular reference to FIG. 2, the system 14 may be provided as software for use with a host data processing or computing facility 18. Single user operated computing devices such as a PC 12 may be selectively connected by one or more electronic networks 19 to various remote computing resources 16, including the host computing facility 18 of the present invention, either by wire or wirelessly via, e.g., the internet or world wide web 19. The computing devices 12 are operated by users authorized by the e.g., automobile manufacturer or new/used car dealer, to access system 14, the level of access granted being variable. Typically, a user will not have full access to the system 14 until registering with the system and providing at least some identification, the details of the registration process being outside of the scope of this application. However, prior to accessing the system, the user will have to enter at least some data, including at least first and last name, e-mail address, phone number, street address including zip code, with the system 14 including a log in screen (not shown) displayable on the user terminal 12 to allow for the entry of the data. This minimal entry of data will limit casual price shopping to preserve system 14 computing resources, and can also be used by the system to determine delivery times and dealer locations as will be described in more detail later.

The host computing facility 18, which is of course typically operated by an entity engaged in the business of providing computing services and associated software to commercial entities (manufacturers/dealers of used/new vehicles in the present example) engaged in interstate commerce as noted above, may include one or more servers 21 for volume data and program storage, including the software application necessary to implement the system 14, and allows for inputting, accessing, (i.e. data capture), and editing all data necessary to allow the user of, e.g., a PC 12 to select, customize, and finally purchase an automobile or components therefor. At least one intelligent client associated with the servers 21 allows for limited and secure access to the servers 21. The host computing facility 18 allows for selectively accessing the remote computing resources 16 (e.g., manufacturer's servers for aftermarket manufacturers of the various components) for performing the various tasks associated with the system 14, the resources 16 providing data relating to price, availability, compatibility, as well as other information necessary for the implementation of the system 14 as will be explained in more detail later. System administrators associated with computing facility 18 serve as a human interface to the system 10 and perform various tasks such as upgrading software, associating aftermarket parts with vehicle make and model for a wide variety of vehicles, hardware maintenance, and communicating various reports and messages to users, including those associated with the manufacturer and or dealer of automobiles, or aftermarket manufacturers, as is known in the art.

Referring again to FIG. 1, the vehicle 10 is represented as a three dimensional image which may be from an actual photograph. In the case of a used vehicle 10 an actual photograph is preferred as explained below. In any event, the image of the vehicle 10 would be made as realistic as possible using CAD/CAM techniques as is known in the art. The vehicle 10 to be customized includes many interior and exterior components, some of which are more aesthetic than functional. By way of an example, two such components, the grill 30 and rims 32 are to be selected for customization by the user of PC 12. The display screen or webpage 33 displaying the selected vehicle includes various icons/textboxes to allow the user to navigate the selection and customization process. A column of textboxes 34, 36 includes identifying indicia appropriate to the component to be considered by the user. In the present example two textboxes 34, 36 are shown, but in practice many will be displayed corresponding to a complete list of components which can be added to the particular vehicle selected. The list of components available for any particular vehicle will of course vary, as will the textboxes 34, 36 and the underlying links. The user can request to view a selected component by clicking (with a computer mouse or equivalent webpage navigating device available for the end user device 12) on a particular textbox, for example textbox 34 labeled grills, which allows the user to navigate to another webpage displaying actual images, e.g. JPEG photos, of an array of grills 30 available for the particular vehicle 10 selected. The navigation process will be performed in the well known manner by clicking on "links", i.e. URLs associated with data processing resources 18, 16 of the manufacturer of the particular component selected. Clicking on the textbox 34 will thus cause the user to navigate to a webpage hosted by data processing resource 18, the webpage having a plurality of components displayed thereon. The user can then double click on the photo of a particular one of the components whereupon a link to a complete virtual or actual image of the component is made. The image is accompanied by text data indicating price, availability, manufacturer, and model number of the selected grill 30 and is displayed in block 35, after which the user is automatically navigated back to the webpage 33. If, for example, the user selects grills 30, then all grills 30 available for the selected vehicle are shown, including those available from the manufacturer of the selected vehicle 10. If the grill 30 selected is available from an aftermarket manufacturer, then the user will be navigated to a resource 16 corresponding to the aftermarket manufacturer so that the selected grill image is displayed in block 35, though this process can be transparent to the user as is known in the art. If the user decides to add a particular grill 30, the image of the grill 30 may be double clicked which, after returning to webpage 33 and displaying the image of the component in block 35, also causes a display of a virtual image of the vehicle 10 with the selected grill 30. This action is repeated for every component to be selected until the user completes the customization process. It should be noted that all aspects of new vehicle configuration will be customizable by using the web interface 33 as shown in FIG. 1. For a new vehicle features that can be customized include, vehicle color, engine size, interior treatments, rims, tires, grills, hood ornaments, spoilers etc. Also, in the case of interior treatments, which includes dashboard and console configurations, materials, trim, and seat and floor mat colors, a simulation of the vehicle interior will be shown, the display being facilitated by way of a suitable CAD/CAM program configured in accordance with the specific requirements of the system of the invention. For example, if the user chooses a full complement of oval gauges, with walnut trim, black leather seats, and gold floor mats, the display in FIG. 1 will display, with sufficient resolution and detail, the selected vehicle interior with the layout as modified by the components chosen. The particular component under consideration (i.e., the most recent component selected) will be displayed in box 35, with the text data as described above.

Except as otherwise noted below, the basic process is the similar to that discussed above, except that a used car dealer or provider of aftermarket parts is the vendor. Also, while there are fewer customizable features, there are typically more aftermarket options (cosmetic and functional) for used cars, as these options will increase with time and the popularity of the vehicle. For example, brand new vehicles don't typically have customized floor mats or grill "bras" available at purchase, these items may not ever be made for unpopular car models. In the case of used vehicles 10 the customizable features are primarily aesthetic, as features such as engines, dashboard layouts, vehicle color, suspension configuration, etc., cannot usually or easily be modified after manufacture. Also, with used vehicles parts for customization do not have to be installed in accordance with one aspect of the invention. Parts may simply be shipped with the vehicle 10, the advantage being that the purchaser can finance the cost of the customizing parts together with the vehicle cost. In this manner the user can have the vehicle "customized" without having to pay the installation fee out of pocket up front. For example, if a user wants an expensive rim upgrade, he can order the rims in the manner discussed below and finance the cost of the rims along with the cost of the vehicle, spreading the cost out over years while incurring only a modest increase in payments. Thus, the inventive process is modified to deal with used cars by offering a customization without installation option.

It should be noted that the matching of customizing components to a selected vehicle requires a complete cataloging of auto parts for all makes and models of vehicles, the cataloging including matching all the vendor's vehicles for sale to all parts compatible with the vehicles on a case by case vehicles. The resultant data, which could be called compatibility data would include photographs of the customizing component or components, would be centrally stored on server 21, the matching process being transparent to the user. Also, for every used car for which there is system data, a complete cataloging of customizing components for that vehicle must be uploaded to server 21, as well as an image of the vehicle 10. Finally, users can use the present system to customize a car that they already own by either uploading an image of the actual vehicle or using a stored image. If using the actual image, the user has the advantage of seeing an image of his actual car "digitally" modified, which image will of course show previous modifications done to the car. The customizing components may be purchased and shipped to the user. Alternatively, the vendor/website operator may offer to install the components at an additional cost, and factor that cost into the final sales price.

The image displayed in box 35 will include the estimated delivery time to the manufacturer of the vehicle 10 of the selected component. It can be appreciated that the system 14 of the invention would require some cooperation of the vehicle manufacturer with manufacturers of various aftermarket components, including compatibility of image data associated with the aftermarket components as displayed on the computing resources 16 associated with the aftermarket manufacturers, as well as compensation agreements and any other arrangements to ensure the efficient delivery of a selected component as would be apparent to one of skill in the art. The delivery time of a selected component is viewable by the user of device 12. Also, the user can click on a particular part of the vehicle 10 as displayed in FIG. 1 to display a particular component in box 35. For example, the user can position the navigating device on wheels 32 to display a selected component for wheels 32 in box 35. Thus, the user can view image and availability data of each component selected in box 35, with the default image in box 35 being the last component added. If the user is not satisfied with the delivery date or the appearance of a selected component, she can choose another component.

Figure 3:
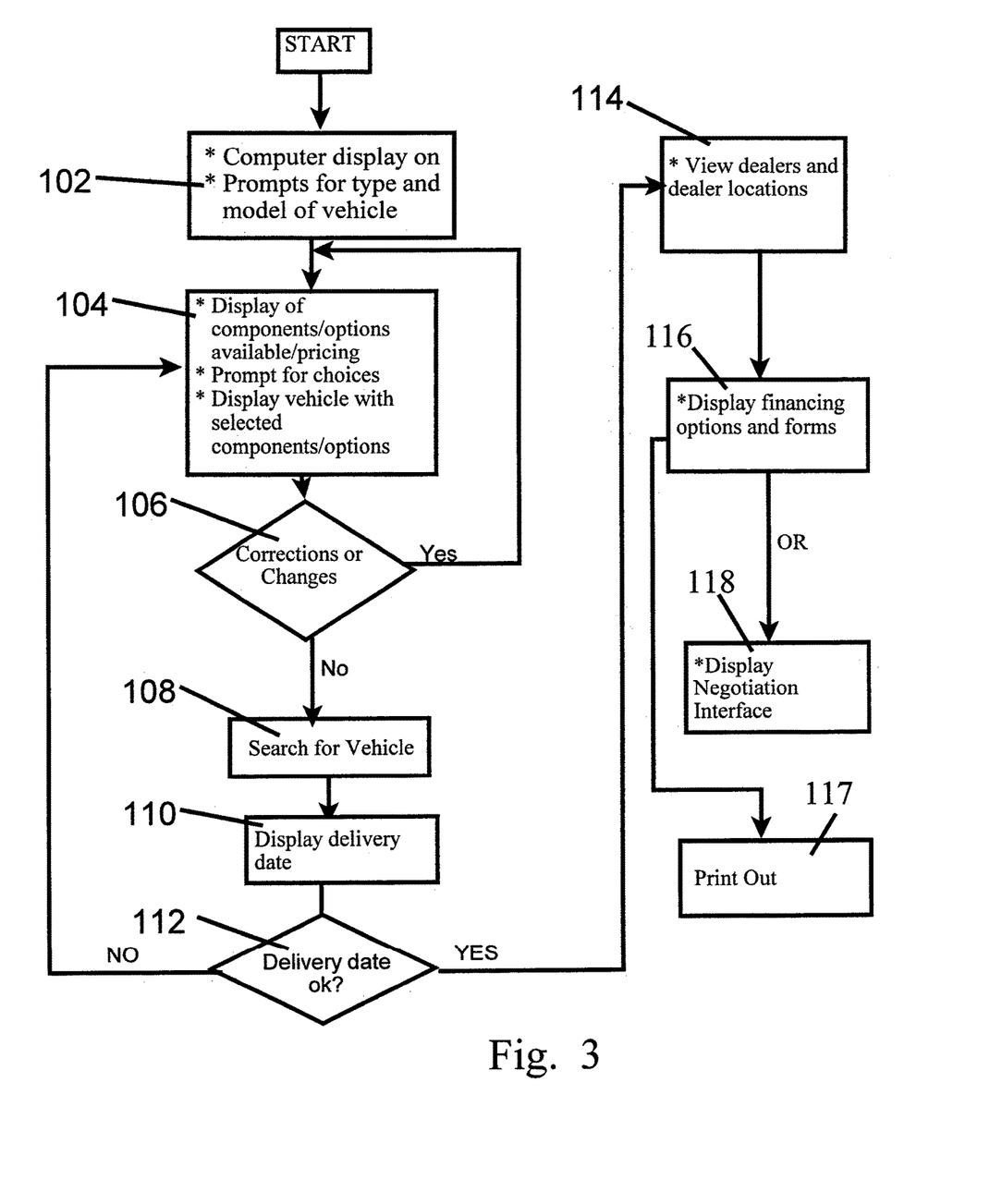
FIG. 3 is a flowchart of the system of the invention.

Referring now to FIG. 3 a flowchart illustrating the method of the invention is shown. It should be noted that while the invention is implemented as software on a computer server 18 in communication with an end user device 12, the final result, in the event of a purchase, is a customized vehicle which may be an automobile, motorcycle, RV, SUV, or boat. Thus the invention is equally applicable to virtually any commodity which is modifiable by the addition or removal of components having an impact on the overall aesthetic or functional qualities of the commodity. The term block or step are used interchangeably and are considered equivalent. The first step of the invention after the initialization of a web browser on the user device 12 is the display of the web page provided by the, e.g., manufacturer of a vehicle to be purchased, which web page prompts the user for the type and model of the vehicle to be customized as shown in block 102. Once the user (the term user hereinafter referring to the user of the end user device 12 unless otherwise indicated) enters the identifying information as described above, the interface or webpage 33 is shown allowing for the display of the vehicle, along with the components and options such as rims 32, wheels, grills 30, fabric options, vehicle color options, etc. as indicated in block 104, and described in more detail above. Also, the MSRP of the vehicle is displayed, as well as the possible delivery date in text box 39 as will be discussed in more detail later. The image of the vehicle 10 is displayed, modified in accordance with the user's selection, updated in real time also as discussed above.

Figure 4:
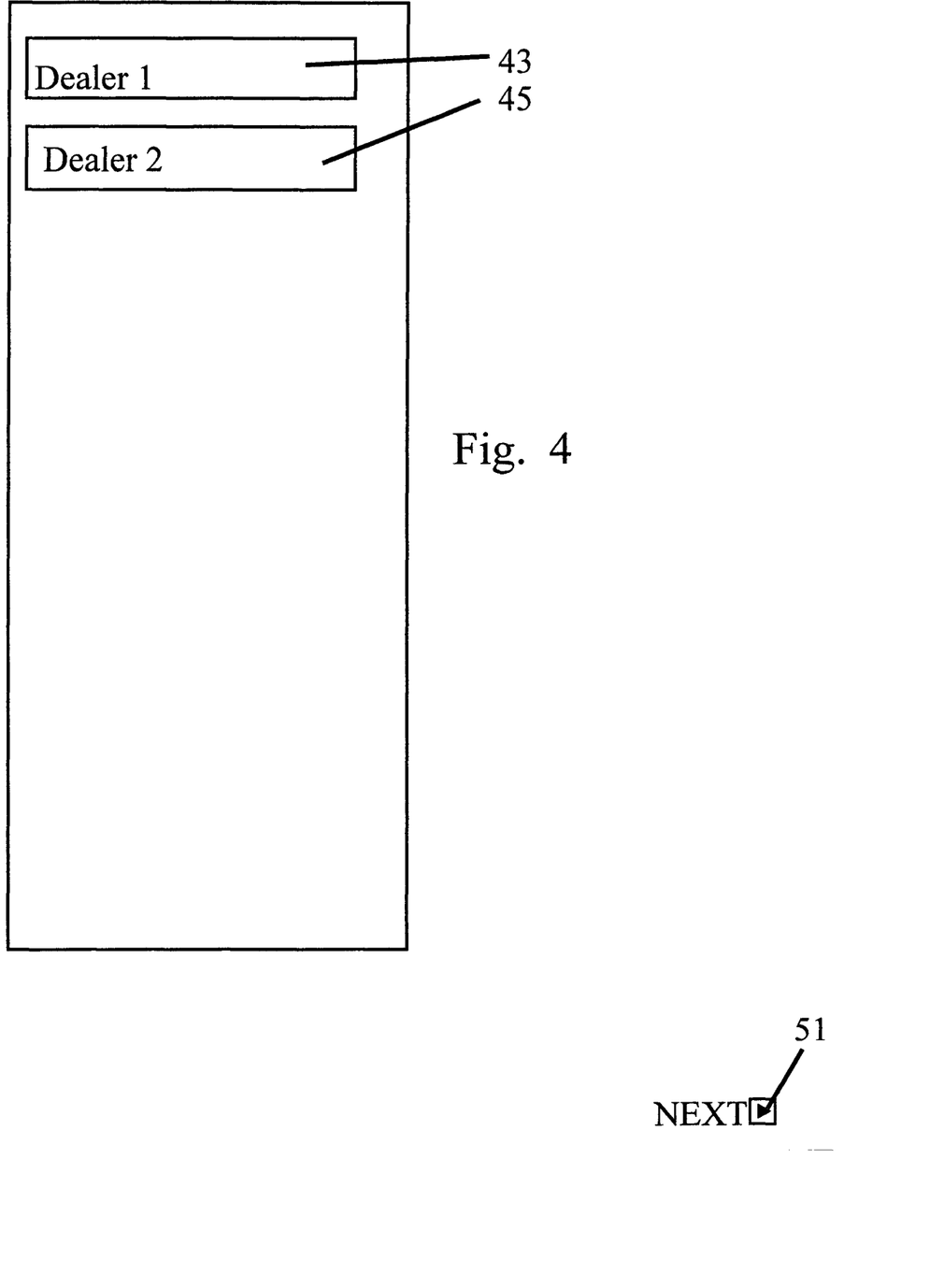
FIG. 4 is a representation of a webpage associated with the system of the invention.
Figure 5:
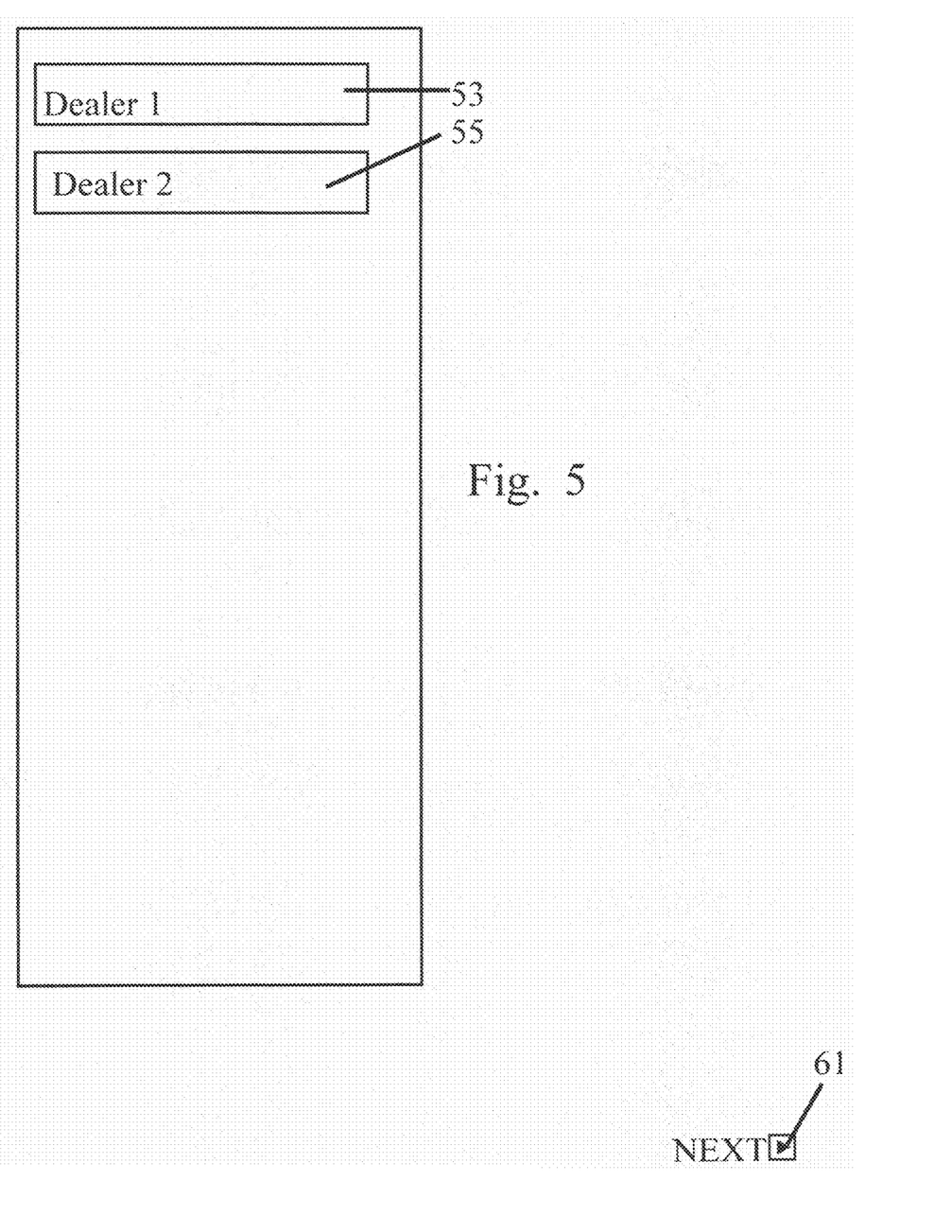
FIG. 5 is a representation of a webpage associated with the system of the invention.
Figure 6:
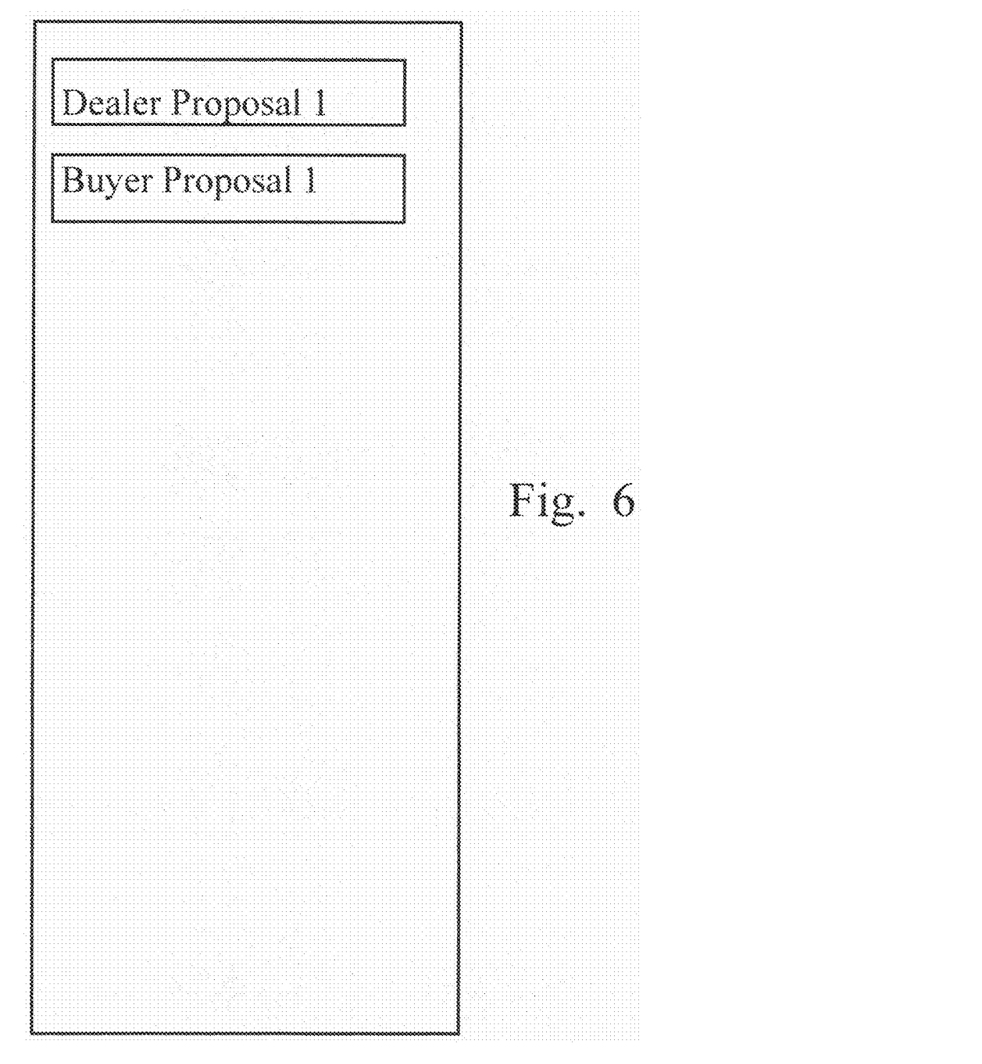
FIG. 6 is a representation of a webpage associated with the system of the invention.

Decision block 106 indicates the recurring steps of selecting and viewing (step 104) a component on or in a virtual image of the vehicle 10 (FIG. 1) until all desired corrections or changes are made. Once the user is satisfied with the vehicle 10 and the selected components as displayed in FIG. 1, he can click the seek icon 37 which causes server 21 to initialize a final search of all relevant databases, including those databases associated with server 21 and resources 16, and advances the system to block 108. The server 21 database will include all components available directly from the vehicle manufacturer. The resources 16 searched by the server 21 include, but are not limited to, databases of the vehicle manufacturer subsidiaries and manufacturers of aftermarket products as shown in block 108, to ascertain that the selected components are available as indicated during step 104. The updated, customized vehicle displayed at step 104 (FIG. 1) includes a display of the price data (MSRP), which data includes the price for individual components available as discussed above. In the case of a purchase of components for a used car, the price data would include the cost of the car plus components, unless the user is only purchasing components, in which case the cost of the components would appear as the price data. The vendor or website operator can include the installation cost in the price data in the used car scenario as discussed above, and the cost can be financed over time. It should be noted that the software required to render the image is typical CAD/CAM software which resides on or is otherwise accessible to server 21 and does not form a part of the invention. In block 110, the system 18 will determine, and display in FIG. 1 (39), an approximate delivery date of the customized vehicle 10. The determination of the delivery date will be based upon a number of factors including the shipping time and delivery of selected components, and the backlog of existing orders for vehicles 10 if any. If the delivery date shown in block 110 (FIG. 1) is not acceptable, then the user may navigate back to the step shown in block 104, to determine, inter alia, which components are delaying the delivery date and perhaps choosing other components using the method as described above, before progressing again to step 106 as shown in block 112. A key aspect of the invention is that the vehicle 10 delivery date can be advanced by selecting more readily available aftermarket components if the user so desires, with the system allowing some transparency regarding which components are delaying the delivery date as discussed above. Otherwise, if the delivery date is acceptable, the customization process is complete and the user proceeds to step 114 by clicking on the next icon 41 (FIG. 1) to view participating dealers and select the most convenient dealer location 43, 45 as seen in FIG. 4. The dealer location will be based upon the user's geographical location which may be determined by the user entering the log in/registration data as described above, the user selecting a maximum radius to limit the display of dealers to those within a reasonable distance if desired. The user may then proceed to the financing/documentation step as shown in block 116, by clicking on next icon 51 as seen in FIG. 4. During this step, displayed in FIG. 5, the user is shown a number of financing options, along with the appropriate forms for proceeding with the application for financing process, which forms are accessed by clicking on a desired option 53, 55. The forms presented to the user at this point will be those prepared by the selected dealer, and the vehicle price (MSRP) will be adjusted in accordance with the dealer pricing schedule. Of course, the financing documentation will include all data relevant to the dealer, already filled in the appropriate boxes/columns, such as make, model, options, price, etc. The user of course fills in the necessary finance data, such as income, desired monthly payment, etc. If merely purchasing aftermarket component for a used car, with or without installation, the user may forgo the financing option step or, alternatively, the financing step is not presented to the user if merely purchasing components. After selecting a desired financing option and filling out the appropriate forms, the user may then either complete the transaction by printing out (block 117) and physically presenting the accumulated documentation to the dealer, which documentation will include information regarding the vehicle make and model, the components and relevant part numbers selected by the user, and the financing documentation as shown in block 116, or the user can proceed with the fully online option as shown in block 118, if available. It can be appreciated that not all manufacturers would desire such a complex transaction to be carried out online with the possibility of internet fraud so this option may only be available to a certain class of users as determined during the log-in and registration process, with the type of verification and documentation required being solely at the discretion of the manufacturer and/or dealer. If the end user device 12 is at the dealer's store location, then the user will be limited to the physical presentation option of step 116. If the user proceeds with the online option of step 118 by clicking on next icon 61, then an additional interface may be presented as shown in FIG. 6 at the option of the dealer selected, which interface will allow for some degree of negotiation of the price, and all allow for the secure entry of data necessary to complete the transaction. At this point, a representative of the selected dealer may be notified by the server 18 of an ongoing negotiation, and intervene to conduct an online or telephonic negotiation to both expedite and refine the process. Methods of notification may include an internet message (IM) directed to personnel designated for continuous monitoring of online negotiations. The system 14 thus allows the dealer to expedite and streamline sales initiated by an internet user, but only after the user 12 has indicated a high level of interest in purchasing the vehicle, to avoid burdening the dealer personnel with users that are merely price shopping. Of course, the system 14 can be used to alert the dealer as soon as the dealer has been selected by the user.

Once the user has completed the customization, financing, and price negotiation, if any, a final date for delivery of the vehicle 10 is established, and the user then acquires the vehicle.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

I claim:

1. A method of manufacturing a customized vehicle from a vehicle manufacturer in response to a user request, said customized vehicle modified with parts from one or more aftermarket manufacturers, each of said aftermarket manufacturers having an aftermarket website with a list of aftermarket parts, said user request generated from a user end terminal networked with one or more servers associated with said vehicle manufacturer, said vehicle manufacturer having a plurality of dealers and a manufacturing facility for the manufacture and modification of vehicles, the method comprising the steps of:

providing a computing facility associated with said vehicle manufacturer, said facility including said server and networked with said user end terminal to allow for real time exchange of text and image data therebetween, said computing facility also networked with each of said aftermarket websites, said server initiating and generating an unmodified three dimensional display of said vehicle in response to a user entered inquiry, said server also initiating a search of one or more of said aftermarket websites in real time in response to said user entered request, said server searching said one or more aftermarket websites for aftermarket components available with said vehicle and generating a list of available aftermarket components for said vehicle, said aftermarket websites having up to date information regarding component availability;

transmitting said three dimensional display of said unmodified vehicle from said server to said user, said transmitted display viewable as part of a product display screen on said user terminal, said product display screen including identifying indicia corresponding to one or more currently selected aftermarket components available with said vehicle, said currently selected aftermarket components corresponding to one or more components selected from said list by said user;

said server generating and transmitting at least a two dimensional image of said currently selected aftermarket components, said two dimensional image appearing on said product display screen in response to a user request, said two dimensional aftermarket component images including data indicating both price and real time availability of said selected aftermarket components;

generating and displaying a modified three dimensional display of said vehicle configured with one or more of said currently selected aftermarket components as selected by the user, and transmitting said modified three dimensional display to said user;

manufacturing the customized vehicle at said manufacturing facility configured with one or more of said selected aftermarket components as selected by the user.

2. The method of claim 1 including the step of providing a list of dealers within a predetermined radius from the user.

3. The method of claim 1 including the step of generating a separate viewing area on said product display screen for display of said currently selected components.

4. The method of claim 3 including the step of generating the at least two dimensional display of one of said currently selected components in said separate viewing area in response to a user request.

5. The method of claim 1 including the step of providing financing options for purchasing said vehicle.

6. The method of claim 1 including the step of providing negotiating options for said user.

7. The method of claim 1 including the step of providing notification to a representative associated with a selected one of said dealers in response to the user selecting one of said negotiating options.

8. The method of claim 3 including the step of providing two or more of said separate areas for displaying two or more of said currently selected components.

* * * * *